United States Patent
Matsubara

(10) Patent No.: US 6,720,199 B2
(45) Date of Patent: Apr. 13, 2004

(54) METHOD FOR MANUFACTURING TFT ARRAY SUBSTRATE OF LIQUID CRYSTAL DISPLAY DEVICE

(75) Inventor: Ryouta Matsubara, Kumamoto (JP)

(73) Assignee: Advanced Display Inc. (JP)

( * ) Notice: Subject to any disclaimer, the term of this patent is extended or adjusted under 35 U.S.C. 154(b) by 0 days.

(21) Appl. No.: 10/088,943

(22) PCT Filed: Jul. 19, 2001

(86) PCT No.: PCT/JP01/06285
§ 371 (c)(1),
(2), (4) Date: Mar. 21, 2002

(87) PCT Pub. No.: WO02/08824
PCT Pub. Date: Jan. 31, 2002

(65) Prior Publication Data
US 2002/0151116 A1 Oct. 17, 2002

(30) Foreign Application Priority Data
Jul. 24, 2000 (JP) .......................................... 2000-221858

(51) Int. Cl.[7] .............................................. H01L 21/00
(52) U.S. Cl. .................... 438/30; 438/149; 438/736; 349/148
(58) Field of Search .................... 438/30, 149; 349/56, 349/73, 74, 148; 345/87

(56) References Cited

U.S. PATENT DOCUMENTS

| | | | | |
|---|---|---|---|---|
| 5,731,855 A | * | 3/1998 | Koyama et al. | 349/43 |
| 6,088,070 A | * | 7/2000 | Ohtani et al. | 349/38 |
| 6,207,480 B1 | * | 3/2001 | Cha et al. | 438/149 |
| 6,310,669 B1 | * | 10/2001 | Kobayashi et al. | 349/43 |

FOREIGN PATENT DOCUMENTS

| | | |
|---|---|---|
| JP | 6-118445 | 4/1994 |
| JP | 9-244065 | 9/1997 |
| JP | 2000-194003 | 7/2000 |

* cited by examiner

Primary Examiner—W. David Coleman
(74) Attorney, Agent, or Firm—Ware, Fressola, Van Der Sluys & Adolphson LLP

(57) ABSTRACT

A semiconductor layer protruding beside a source line is removed in order to increase aperture ratio, decrease resistance of the source line and prevent source-common capacitance from increasing. When a part of a passivation film is removed to form a contact hole, the passivation film on the source line, the passivation film beside the source line and a gate insulating layer beside the source line are simultaneously removed. A portion protruding beside the source line is removed from thus exposed semiconductor layer using a resist pattern for removing the part of the passivation film and/or the source line as a mask.

16 Claims, 13 Drawing Sheets

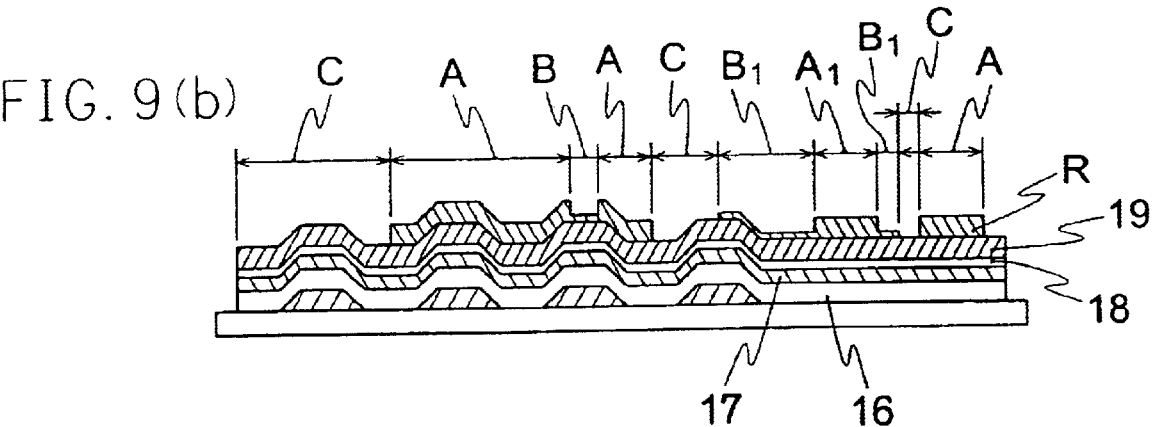
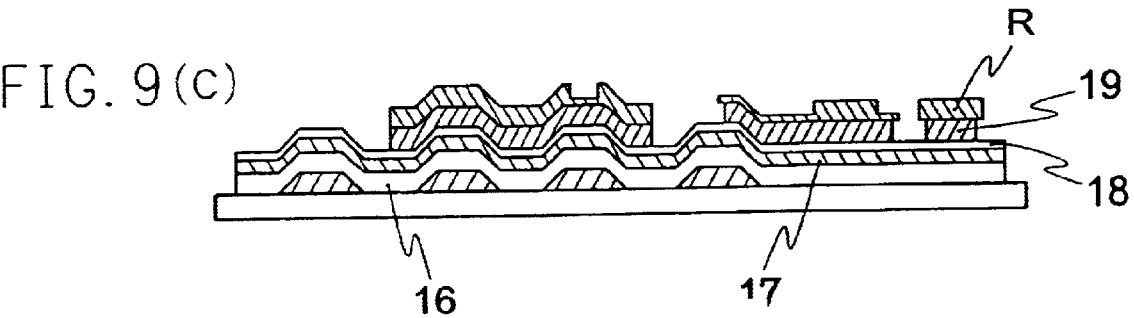
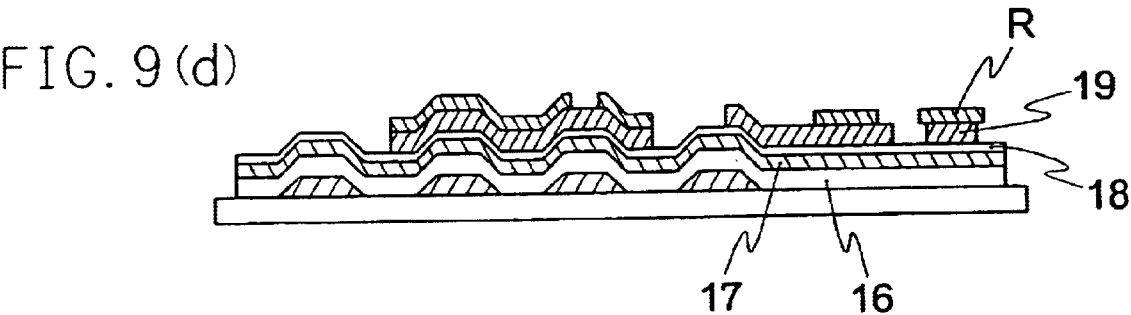
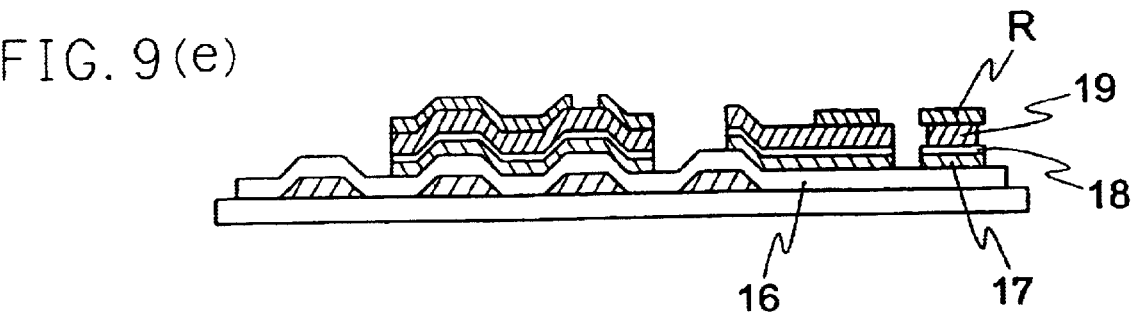

METHOD FOR MANUFACTURING TFT ARRAY SUBSTRATE OF LIQUID CRYSTAL DISPLAY DEVICE

TECHNICAL FIELD

The present invention relates to a method for manufacturing a liquid crystal display device, and more particularly to a method of manufacturing a TFT array substrate of an active matrix liquid crystal display.

BACKGROUND ART

In a liquid crystal display, an electro-optic characteristic of a liquid crystal is utilized and combined with a polarizing plate in order to carry out display by controlling a voltage to be applied to the liquid crystal. A liquid crystal display has a light weight than that of a CRT and is excellent in portability, so that has been applied to a display device of a mobile computer in recent years.

In particular, an active matrix liquid crystal display, in which a switching element such as a thin film transistor (TFT) is provided for each pixel to control a voltage to be applied to a liquid crystal, is characterized by a higher display quality as compared with a simple matrix type liquid crystal display, and has vigorously been developed and applied.

FIG. 1 shows an equivalent circuit of a basic active matrix type liquid crystal display, and an operation thereof will be described. FIG. 1(b) is a partially enlarged view showing a P portion of FIG. 1(a).

A switching element 7 such as a TFT, a liquid crystal capacitance (capacitance of liquid crystal in the pixel) 8 and an auxiliary capacitance 9 are formed to define a pixel in the intersecting portion of a gate line 1 and a source line 2. The pixels are arranged in a matrix to form a TFT array substrate.

When a selection pulse is applied to the gate line, all of the switching elements connected to the gate line are turned ON and a signal applied to a source line connected to each switching element is written to the liquid crystal capacitance and the auxiliary capacitance through the switching element. When the application of the selection pulse is completed and the gate line is brought into a non-selection state, the switching elements are turned OFF so that electric charges written to the liquid crystal capacitance and the auxiliary capacitance are held until one vertical scanning period passes and the selection pulse is applied again to the gate line.

In the active matrix type liquid crystal display, usually, a switching element such as a TFT is provided on one of two substrates to form a TFT array substrate, a common electrode is provided on the other substrate to form a counter substrate, and the two substrates are opposed to each other interposing a liquid crystal layer therebetween.

A method for manufacturing a TFT array substrate according to the conventional art will be described with reference to FIGS. 2, 3 and 4.

FIG. 2 is an enlarged plane view showing the main part of the TFT array substrate. In FIG. 2, a TFT comprising a gate electrode 12, a source electrode 21 and a drain electrode 22 is formed in the intersecting portion of a gate line 13 and a source line 20, and the drain electrode 22 of the TFT is connected to a pixel electrode 27 through a contact hole 24. In order to apply a selection pulse from the outside, the end of the gate line 13 is extended to the outside of a display region of the liquid crystal display to form a lower pad 15.

The lower pad 15 is connected to an upper pad 28 through a contact hole 25, and the selection pulse is inputted from the upper pad.

The end of the gate line 20 is also extended to the outside of the display region of the liquid crystal display to form a lower pad 23, which is not shown in FIG. 2. The lower pad 23 is connected to an upper pad 29 through a contact hole 26, and a signal is inputted from the upper pad.

The reference numeral 14 in FIG. 2 denotes a common line for forming an auxiliary capacitance together with a pixel electrode 27. Moreover, the reference numeral 38 denotes a channel of the TFT.

FIGS. 3 and 4 are sectional views illustrating the method for manufacturing a TFT array substrate in FIG. 2.

First of all, a first metal layer is formed on an insulating substrate 11 by using a method such as sputtering. The first metal layer comprises metal such as Cr, Al or Mo, an alloy containing the metal as an essential component, or a laminated layer thereof. Then, photolithography is carried out by using a photoresist, thereby removing an unnecessary portion from the first metal layer by etching or the like. Thus, a gate electrode 12, a gate line 13, a common line 14 and a lower pad 15 are formed. This state is shown in FIG. 3(a).

Next, an insulating film (a gate insulating film) 16 comprising SiNx or $SiO_2$ is formed by various CVD methods such as plasma CVD, or by sputtering, evaporation, coating or the like. Furthermore, an a-Si:H layer (a first semiconductor layer) 17, and a semiconductor layer (an impurity semiconductor layer or a second semiconductor layer) 18 such as an n+a-Si:H film or a microcrystal n+Si layer which is doped with an impurity such as phosphorus, antimony or boron are formed by plasma CVD, sputtering or the like. Furthermore, a second metal layer 19 is formed by using sputtering or the like. A second metal layer comprises metal such as Cr, Al or Mo, an alloy containing the metal as an essential component or a laminated layer thereof.

Subsequently, a photoresist R is applied to form a resist pattern comprising a region A in which the photoresist R has a great thickness, a region B in which the photoresist R has a small thickness, and a region C in which the photoresist R is removed. This state is shown in FIG. 3(b).

Next, the second metal layer 19 is subjected to etching by using the resist pattern. The second metal layer 19 in the region C having no photoresist R is selectively removed. This state is shown in FIG. 3(c).

Then, the photoresist R in the region B is removed. At this time, since the photoresist R in the region A has a great thickness, it is not removed but remained. This state is shown in FIG. 3(d).

Next, the photoresist R remaining in the region A is used to first etch the semiconductor layers 18 and 17, thereby removing the semiconductor layers 18 and 17 in the region C, and to then etch the second metal layer 19, thereby removing the second metal layer 19 in the region B. This state is shown in FIGS. 3(e) and 4(a).

Furthermore, the semiconductor layer 18 in the region B is removed by etching and the whole resist R is then removed. This state is shown in FIG. 4(b). A source line 20, a source electrode 21, a drain electrode 22 and a lower pad 23 are formed on a substrate.

Subsequently, a protective film 35 is formed over the whole surface and photolithography is then carried out by using the photoresist or the like, and contact holes 24, 25 and 26 are formed by etching or the like. This state is shown in FIG. 4(c).

Finally, ITO (Indium Tin Oxide) is formed over the whole surface, the photolithography is carried out by using the photoresist or the like, and an unnecessary portion is removed by etching to form an ITO pixel electrode 27 and upper pads 28 and 29. This state is shown in FIG. 4(*d*).

According to the manufacturing method described above, a TFT array substrate can be manufactured by carrying out the photolithography four times in total, that is, by means of four photomasks. Therefore, a process can be shortened and a cost can be reduced.

In the above-mentioned manufacturing method, meanwhile, the source line 20, the source electrode 21, the drain electrode 22 and the lower pad 23, and the semiconductor layers 18 and 17 which are positioned thereunder are formed by using the same photoresist R. However, because methods or conditions of the etching are different, an amount of a reduction in the widthwise direction (side etching amount) in the line during the etching of the second metal layer 19 is larger than the side etching amounts of the semiconductor layers 18 and 17. As shown in FIGS. 4(*a*) to 4(*d*), therefore, the semiconductor layer 18 and the semiconductor layer 17 are protruded beside the source line 20.

In general, in the case in which the material of the source line (i.e. the second metal layer 19) is Cr, Al, Mo or the like, the side etching amount is approximately 0.5 to 1.0 µm on either side. On the other hand, the side etching amounts of the semiconductor layer 18 and the semiconductor layer 17 are approximately 0 µm. Accordingly, in the case in which the width of the source line in the photomask to be used in the photolithography is 10 µm, a source line to be actually formed has a width of 8 to 9 µm and the semiconductor layer 18 and the semiconductor layer 17 are protruded by approximately 1 to 2 µm.

In order to obtain a liquid crystal display in which display having a high luminance can be carried out and a display quality is excellent, it is desirable that the aperture ratio of a TFT array substrate should be increased as much as possible. In order to prevent the delay of a signal to be applied to the source line 20 and a degredation in a display quality such as an uneven luminance, moreover, it is desirable that the resistance of the source line 20 should be reduced as much as possible.

If the protrusion of the semiconductor layer 18 and the semiconductor layer 17 can be removed, the aperture ratio can be enhanced without decreasing the width of the source line 20, that is, without increasing the resistance of the source line 20. In addition, if the aperture ratio is equal, the width of the source line 20 can be more increased so that the resistance of the source line 20 can be reduced.

Furthermore, there is also a problem in that the semiconductor layers 18 and 17 thus protruded form a capacitance together with the common electrode of the counter substrate, thereby increasing a source-common capacitance.

In the method of manufacturing a TFT array substrate using four photomasks described above, particularly, the second metal layer 19 (the source line 20) is exposed to the etching plural times (see FIG. 3(*c*) and FIG. 4(*a*)).

For this reason, the difference between the side etching amount of the source line 20 and the side etching amounts of the semiconductor layers 18 and 17 is further increased. For example, in the case in which the source line in the photomask has a width 10 µm, a source line to be actually formed has a width of approximately 6 to 7 µm and the semiconductor layers 18 and 17 are protruded by approximately 3 to 4 µm.

Accordingly, a reduction in the aperture ratio, an increase in the resistance of the source line and an increase in the source-common capacitance have become more serious. Therefore, there has been greatly desired a manufacturing method capable of removing the protruded semiconductor layers 18 and 17.

It is an object of the present invention to remove a semiconductor layer protruded beside a source line in a process for manufacturing a TFT array of an active matrix liquid crystal display device.

SUMMARY OF INVENTION

According to the present invention, a gate line, a source line, a TFT element and the like are formed; thereafter a passivation film is then formed; and the passivation film on the source line, the passivation film provided beside the source line and a gate insulating film provided beside the source line are simultaneously removed to expose the source line and a semiconductor layer provided under the source line when removing a part of the passivation film to form a contact hole.

Furthermore, a portion in the exposed semiconductor layer which is protruded besides the source line is removed by using, as a mask, a resist pattern for removing a part of the passivation film and/or a source line.

Alternatively, a portion in the exposed semiconductor layer which is protruded beside the source line is removed by using, as a mask, the passivation film from which a part thereof is removed and/or the source line.

According to another aspect of the present invention, a gate line, a source line, a TFT element and the like are formed and a passivation film is not then formed, and a portion in a semiconductor layer provided under the exposed source line which is protruded beside the source line is removed by using the source line as a mask.

According to still another aspect of the present invention, a semiconductor layer is caused to remain beside the source line when forming the source line. Consequently, when removing a part of the passivation film to form a contact hole, only the passivation film provided on and beside the source line is removed and a gate insulating film provided beside the source line is not removed.

Furthermore, a portion in the semiconductor layer exposed by the removal of the passivation film which is protruded beside the source line is removed by using, as a mask, a resist pattern for removing a part of the passivation film and/or the source line.

Alternatively, a portion in the semiconductor layer exposed by the removal of the passivation film which is protruded beside the source line is removed by using, as a mask, the passivation film from which a part thereof is removed and/or the source line.

In the present invention, when selectively removing a part of an ITO film, the ITO film provided on the source line is not removed but may be left to cover the source line.

BRIEF DESCRIPTION OF DRAWINGS

FIG. 9 is a sectional view for explaining a method for manufacturing a TFT array substrate according to a third embodiment of the present invention;

BEST MODE FOR CARRYING OUT THE INVENTION

Embodiments of the present invention will be described below with reference to the drawings.

Embodiment 1

The EMBODIMENT 1 of the present invention will be described with reference to FIGS. 5, 6 and 7. FIGS. 5, 6 and 7 are sectional views showing a TFT array substrate provided with a reverse stagger type TFT, illustrating a manufacturing method therefor.

The method for manufacturing the TFT array substrate according to the EMBODIMENT 1 of the present invention includes the following steps.

Figure 1A:
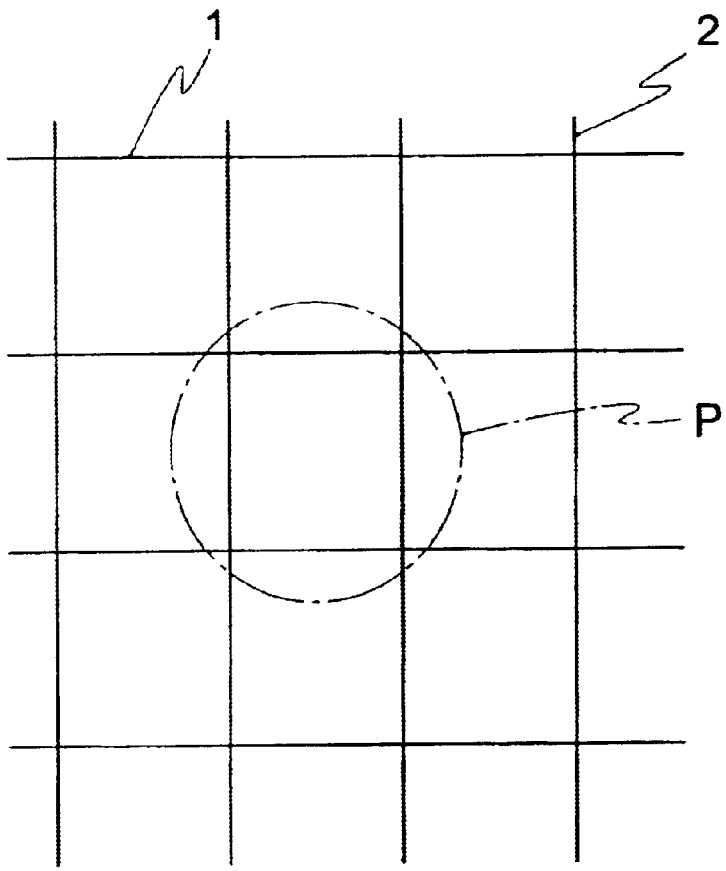
FIG. 1 is a view for explaining the operation of an active matrix liquid crystal display device.
Figure 1B:
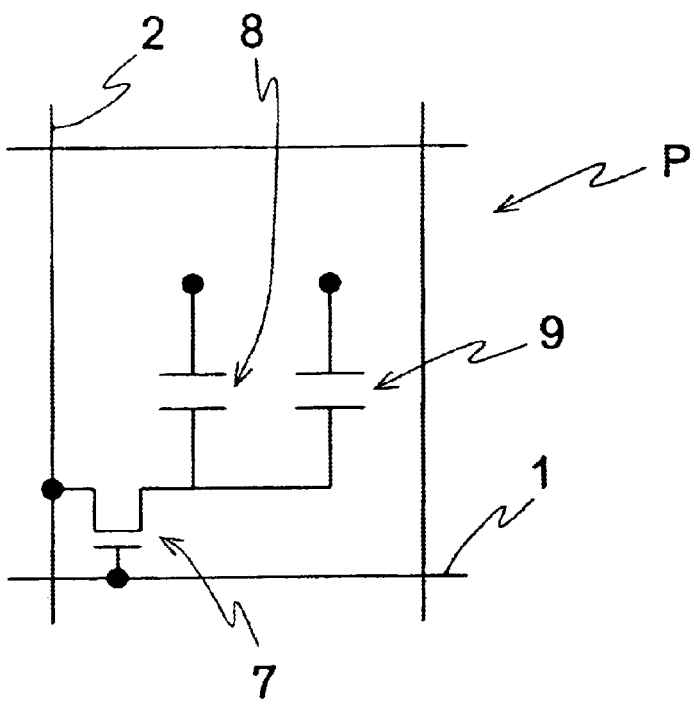
Figure 2:
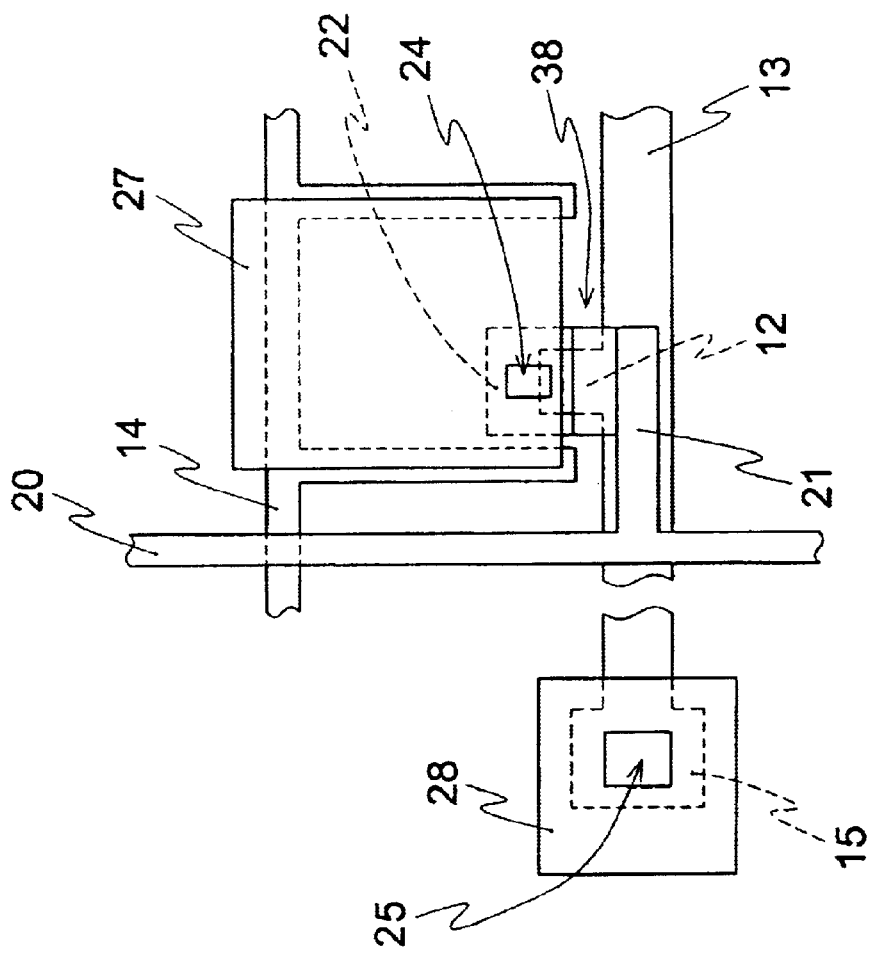
FIG. 2 is an enlarged plan view showing the main part of a TFT array substrate.
Figure 3A:
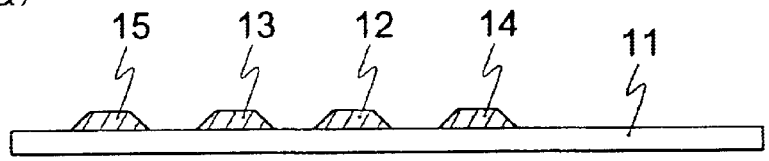
FIG. 3 is a sectional view for explaining a method for manufacturing the TFT array substrate in FIG. 2 according to the conventional art.
Figure 3B:
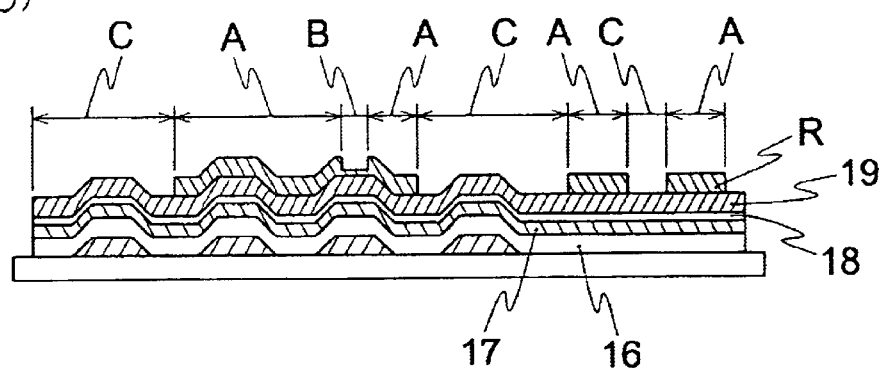
Figure 3C:
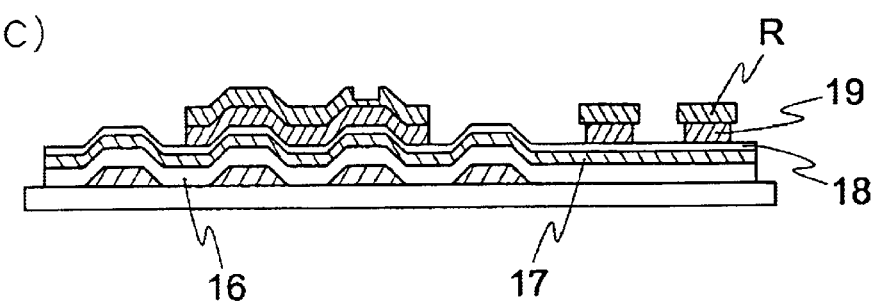
Figure 3D:
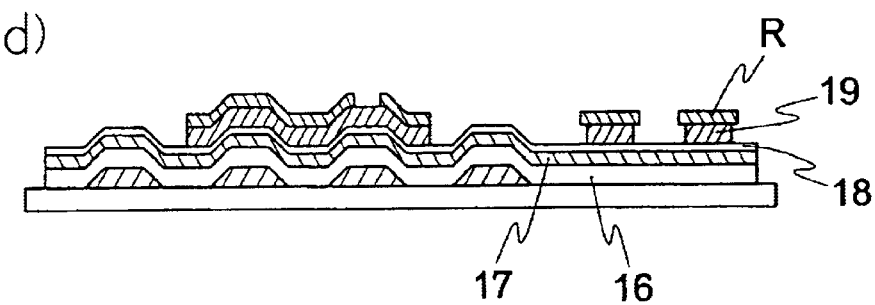
Figure 3E:
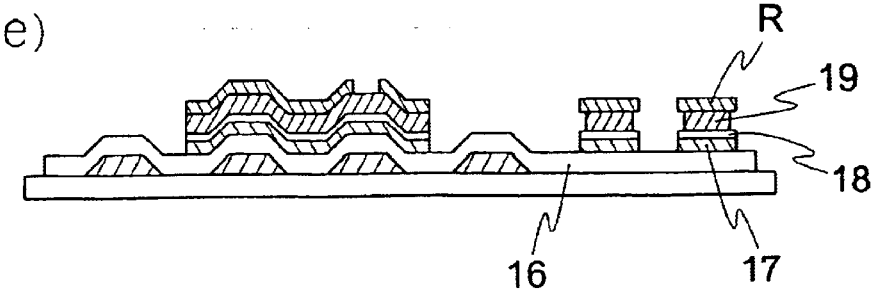
Figure 4A:
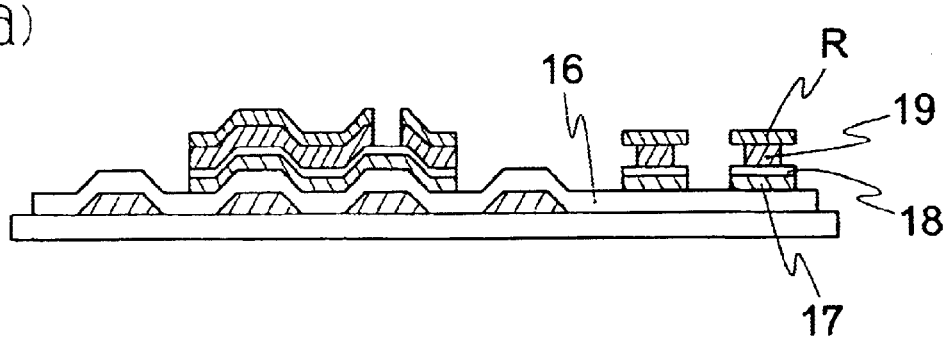
FIG. 4 is a sectional view for explaining the method for manufacturing the TFT array substrate in FIG. 2 according to the conventional art, illustrating succeeding steps to FIG. 3.
Figure 4B:
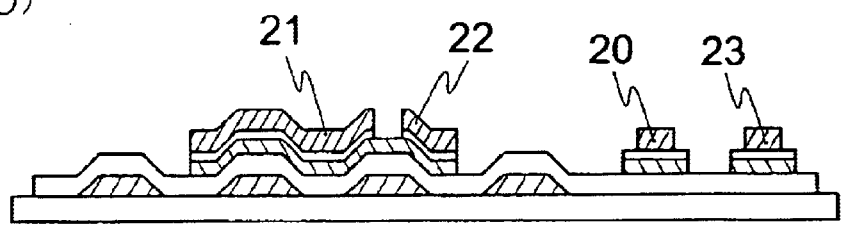
Figure 4C:
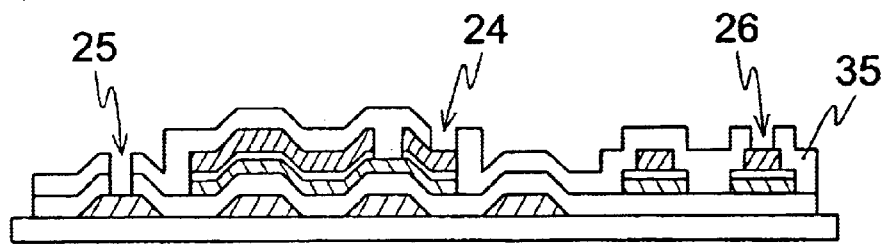
Figure 4D:
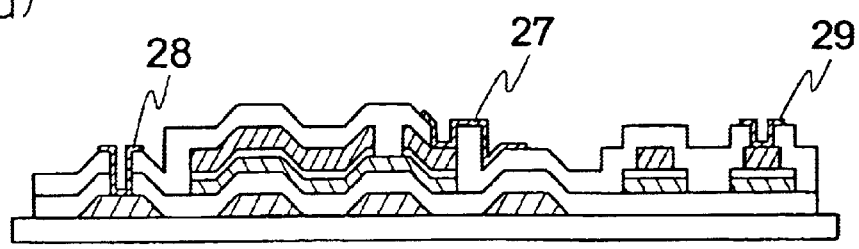
Figure 5A:
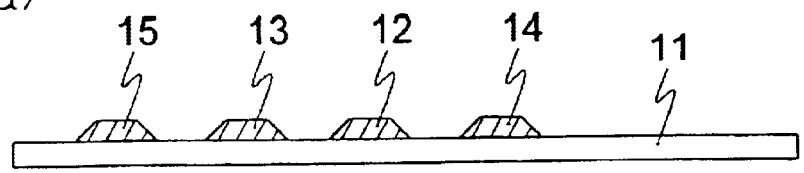
FIG. 5 is a sectional view for explaining a method for manufacturing a TFT array substrate according to a first embodiment of the present invention.

(1) First of all, a first metal layer is formed on an insulating substrate 11, photolithography is then carried out by using a photoresist or the like, an unnecessary portion is removed from the first metal layer by etching or the like, and a gate electrode 12, a gate line 13, a common line 14 and a lower pad 15 are formed (FIG. 5(a)).

(2) Next, four layers of a gate insulating film 16 comprising SiNx, $SiO_2$ or the like, an a-Si layer (an amorphous semiconductor film, a first semiconductor layer) 17, an n+a-Si layer (an amorphous impurity semiconductor film, a second semiconductor layer) 18 and a second metal layer 19 are formed on the substrate in order to cover the gate electrode 12, the gate line 13, the common line 14 and the pad 15.

(3) After a photoresist R is applied, a resist pattern including a region A in which the photoresist R has a great thickness, a region B in which the photoresist R has a small thickness, and a region C in which the photoresist R is removed is formed using a photomask.

Figure 5B:
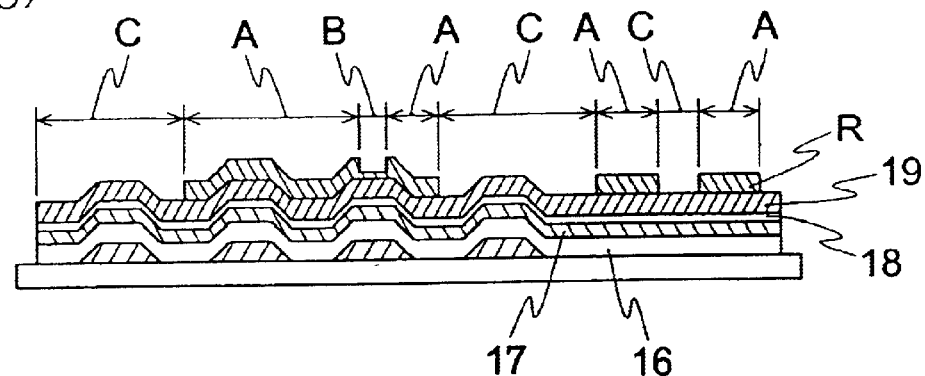

The region A in which the photoresist R has a great thickness corresponds to a region in which the second metal layer 19 is to be left as a source electrode, a drain electrode, a source line and a drain line, the region C from which the photoresist R is removed corresponds to a region in which at least the second metal layer 19, the second semiconductor layer 18 and the first semiconductor layer 17 are to be etched and removed, and the region B in which the photoresist R has a small thickness corresponds to a region in which the second metal layer 19 and the second semiconductor layer 18 are to be removed to form a TFT channel portion 38 (FIG. 5(b)).

In the present embodiment, only the TFT channel portion 38 is set to be the region B. Although the region B is not limited to the TFT channel portion 38, the present invention is characterized in that at least a portion to be a source line 20 later and a vicinity thereof are not set to be the region B.

Figure 5C:
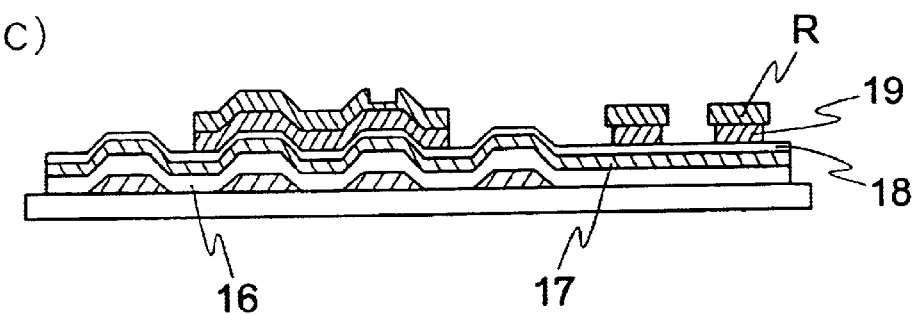
Figure 5D:
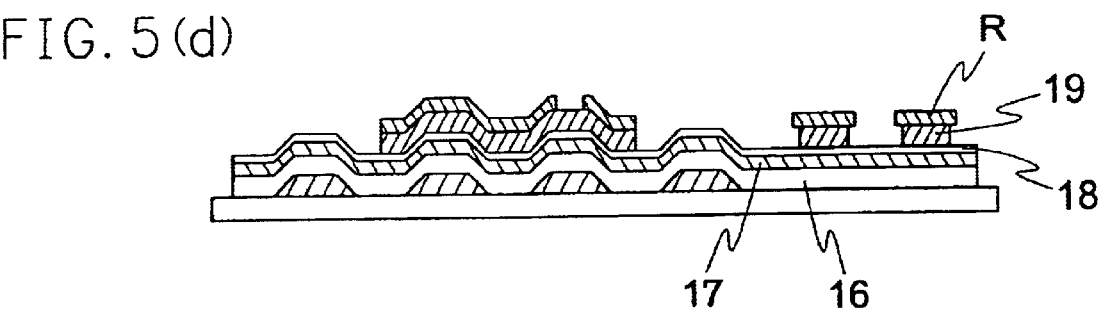

(4) Next, the second metal layer 19 in the C region is first removed by etching (FIG. 5(c)).

(5) Then, the photoresist R in the region B is removed. At this time, since the photoresist R in the region A has a great thickness, it is not removed but left (FIG. 5(d)).

Figure 5E:
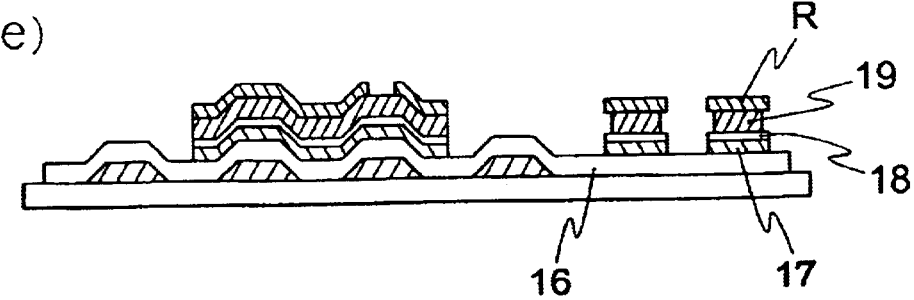

(6) Thereafter, the semiconductor layers 18 and 17 in the region C are removed by the etching or the like (FIG. 5(e)).

Figure 6A:
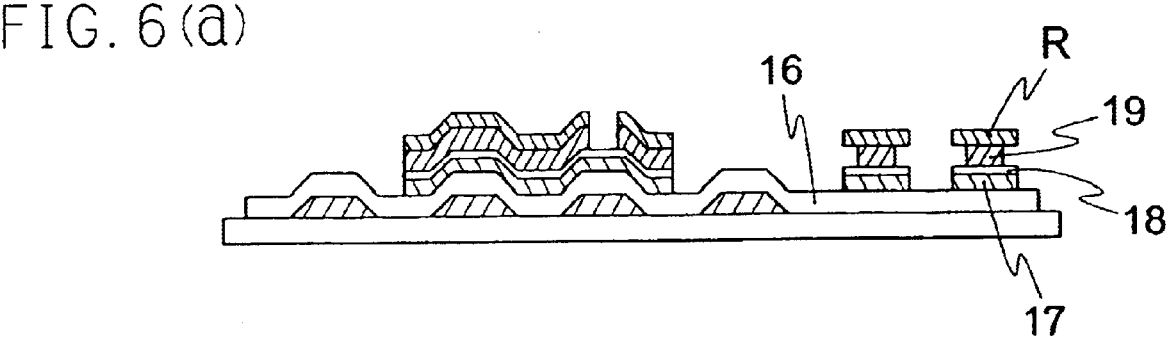
FIG. 6 is a sectional view for explaining the method for manufacturing a TFT array substrate according to the first embodiment of the present invention, illustrating succeeding steps to FIG. 5.

(7) Furthermore, the second metal layer 19 in the region B is removed (FIG. 6(a)).

Figure 6B:
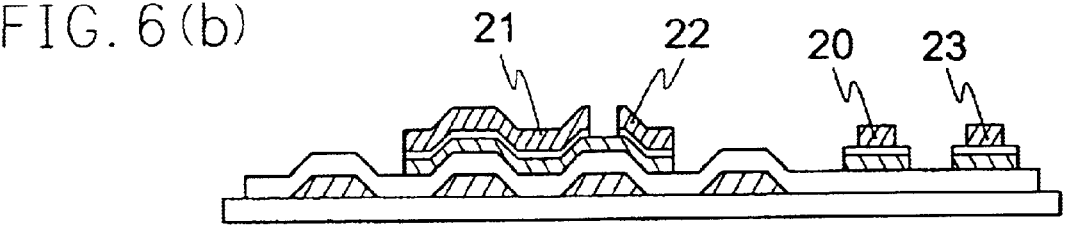

(8) Subsequently, the second semiconductor layer 18 in the region B is removed and the whole photoresist R is then removed (FIG. 6(b)).

The above-described steps are the same as those in the conventional art and the source line 20 comprising the second metal layer 19 has a larger side etching amount as compared with the semiconductor layer 18 and the semiconductor layer 17 as described above. Therefore, the semiconductor layer 18 and the semiconductor layer 17 are protruded beside the source line 20.

Figure 6C:
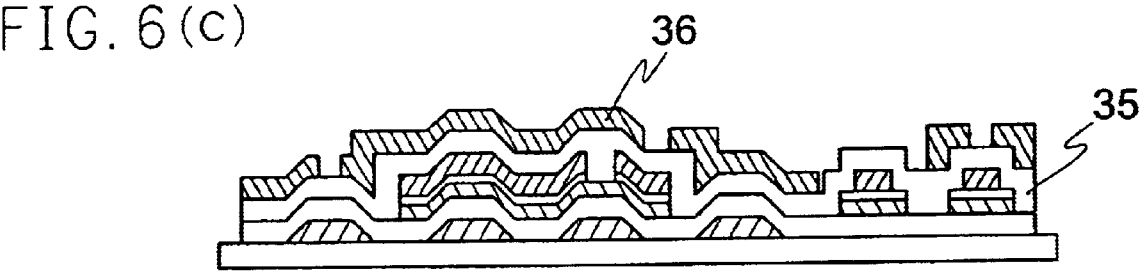

(9) After a passivation film 35 is formed on the whole surface of the TFT array substrate in this condition, a photoresist is applied and a resist pattern 36 is formed by using a photomask (FIG. 6(c)).

The resist pattern 36 is used for removing a part of the passivation film 35 to form contact holes 24, 25 and 26 at a next step, and at the same time, has such a pattern that the passivation film 35 in a region 30, i.e. on the source line 20 and the vicinity thereof, is also removed.

(10) By using the resist pattern 36, the passivation film 35 is etched to form a contact hole 24 for electrically connecting a drain electrode 22 to an ITO pixel electrode 27, a contact hole 25 for electrically connecting the lower pad 15 to an upper pad 28, and a contact hole 26 for electrically connecting a lower pad 23 to an upper pad 29. At this time, as described above, the passivation film 35 in the region 30, that is, on the source line 20 and the vicinity thereof, is also removed, and at the same time, the gate insulating film 16 in the region 30 is also removed (FIG. 6(d)).

Figure 7A:
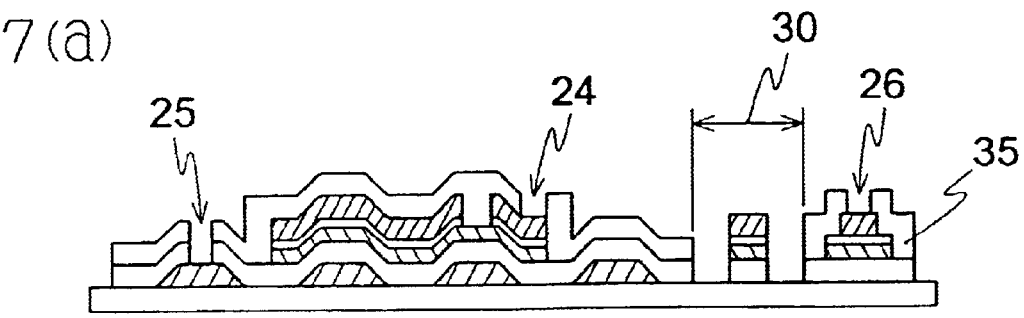
FIG. 7 is a sectional view for explaining the method for manufacturing a TFT array substrate according to the first embodiment of the present invention, illustrating succeeding steps to FIG. 6.

(11) Next, etching is carried out by using the resist pattern 36 and the source line 20 as masks, thereby removing the semiconductor layers 18 and 17 protruded beside the source line 20, and thereafter the resist pattern 36 is removed (FIG. 7(a)).

At this time, the resist pattern may be removed earlier and the protruded semiconductor layers 18 and 17 may be etched by using the passivation film 35 and the source line 20 as masks.

Moreover, the second metal layer 19 forming the source line 20 is to be formed of such a material as not to be etched simultaneously with the etching of the protruded semiconductor layers 18 and 17, for example, Cr or the like.

Figure 7B:
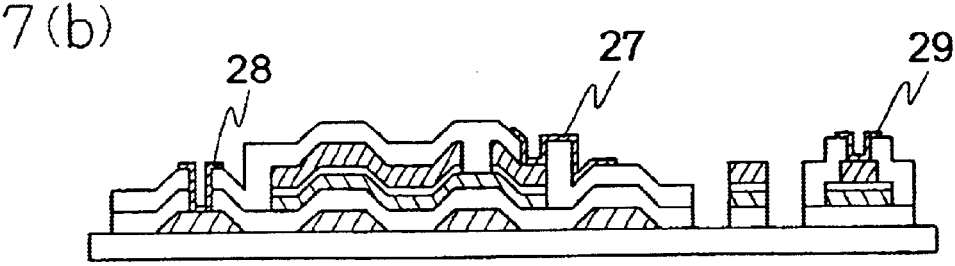

(12) Then, an ITO film is formed over the whole surface and photolithography is thereafter carried out by using a photoresist or the like, and patterning for removing an unnecessary portion of the ITO film is performed by etching, thereby forming an ITO pixel electrode 27 and upper pads 28 and 29 (FIG. 7(b)).

As described above, according to the present invention, a TFT array substrate can be manufactured by carrying out the same number of photolithography, that is, four times in total as the conventional manufacturing method. Therefore, using four photomasks which is the same number as that in the conventional manufacturing method, a TFT array substrate can be manufactured and the semiconductor layer 18 and the semiconductor layer 17 which are protruded beside the source wiring can be removed.

Accordingly, higher aperture ratio of the TFT array substrate and lower resistance of the source line can be achieved without increasing a time and cost required for manufacture, and furthermore, it is possible to eliminate the drawback of the conventional art that a source-common capacitance is increased.

Embodiment 2

Figure 8:
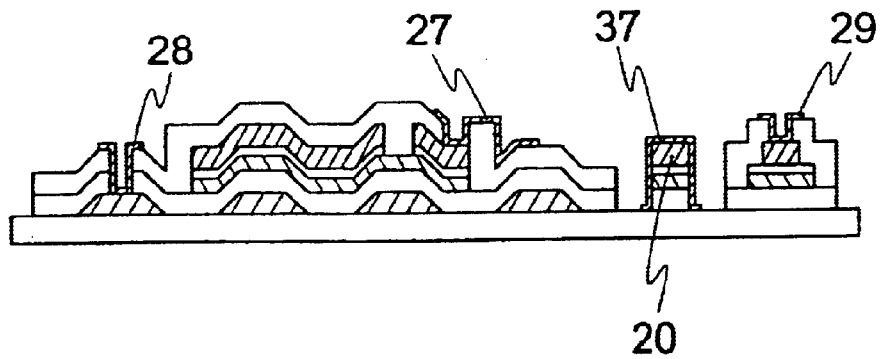
FIG. 8 is a sectional view for explaining a method for manufacturing a TFT array substrate according to a second embodiment of the present invention.

The EMBODIMENT 2 of the present invention will be described with reference to FIG. 8.

The present embodiment is characterized in that a source line 20 is covered with an ITO film 37.

In the EMBODIMENT 1, the source line 20 is exposed as is apparent from FIG. 7(b). Accordingly, it is necessary to select a material which is not reactive to a liquid crystal for the material of the source line 20, that is, the second metal layer 19.

In the present embodiment, an ITO film provided on the source line 20 is left through the patterning of the ITO film, thereby forming the ITO film 37 covering the source line 20 and semiconductor layers 17 and 18 positioned under the source line 20.

Since the ITO film 37 covers the source line 20, a degree of freedom for the selection of the material of the source line 20 (a second metal layer 19). Furthermore, both the source line 20 and the ITO film 37 function as source line. Therefore, the resistance of the source line can be reduced. Moreover, even if the source line 20 is broken, the ITO film 37 fills a redundant role so that reliability can also be enhanced.

Embodiment 3

The EMBODIMENT 3 of the present invention will be described with reference to FIGS. 9, 10 and 11. FIGS. 9, 10 and 11 are sectional views showing a TFT array substrate provided with a reverse stagger type TFT, illustrating a manufacturing method therefor.

In the EMBODIMENT 1, a gate insulating film 16 is also removed in a region 30 in the vicinity of a source line 20 as is apparent from FIG. 7(b). Accordingly, in the case in which the source line 20 and a common line 14 are provided adjacently, there is a possibility that a short circuit might be caused between both lines. In the present embodiment, therefore, the gate insulating film 16 is not removed but left in the region 30 in the vicinity of the source line 20.

The process will be described below.

(1) First of all, a first metal layer is formed on an insulating substrate 11 and is then patterned by using photolithography to form a gate electrode 12, a gate line 13, a common line 14 and a lower pad 15 (FIG. 9(a)).

(2) Next, four layers of a gate insulating film 16, a first semiconductor layer 17, a second semiconductor layer 18 and a second metal layer 19 are formed on the substrate in order to cover the gate electrode 12, the gate line 13, the common line 14 and the pad 15.

(3) After a photoresist R is applied, a resist pattern including a region A ($A_1$) in which the photoresist R has a great thickness, a region B ($B_1$) in which the photoresist R has a small thickness, and a region C in which the photoresist R is removed is formed using a photomask.

While only the TFT channel portion is set to be the region B in the EMBODIMENT 1, the region $B_1$, in which the photoresist R has a small thickness is provided also in the vicinity of the region $A_1$ to be the source line later in the present embodiment (FIG. 9(b)).

(4) Next, the second metal layer 19 in the C region is first removed by etching or the like (FIG. 9(c)).

(5) Next, while the photoresist R in the region A ($A_1$) is left, the photoresist R in the region B ($B_1$) is removed (FIG. 9(d)).

(6) Thereafter, the semiconductor layers 18 and 17 in the region C are removed by etching or the like (FIG. 9(e)).

Figure 10A:
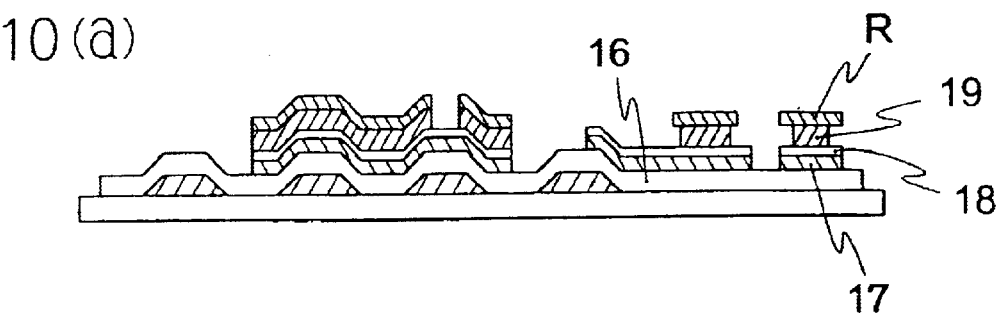
FIG. 10 is a sectional view for explaining the method for manufacturing a TFT array substrate according to the third embodiment of the present invention, illustrating succeeding steps to FIG. 9.

(7) Furthermore, the second metal layer 19 in the region B ($B_1$) is removed (FIG. 10(a)).

Figure 10B:
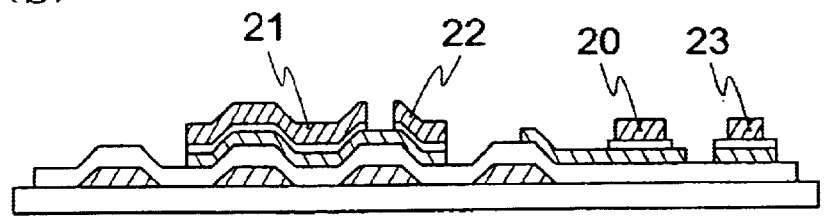

(8) Subsequently, the second semiconductor layer 18 in the region B ($B_1$) is removed and the whole photoresist R is then removed (FIG. 10(b)).

As described above, the source line 20 comprising the second metal layer 19 has a larger side etching amount as compared with the second semiconductor layer 18. Therefore, the semiconductor layer 18 is protruded beside the source line 20.

Figure 10C:
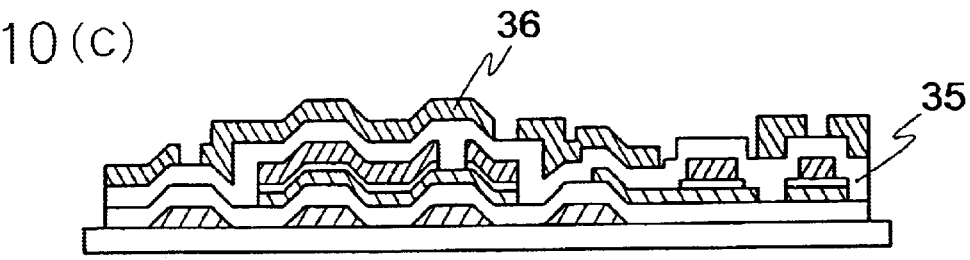
Figure 10D:
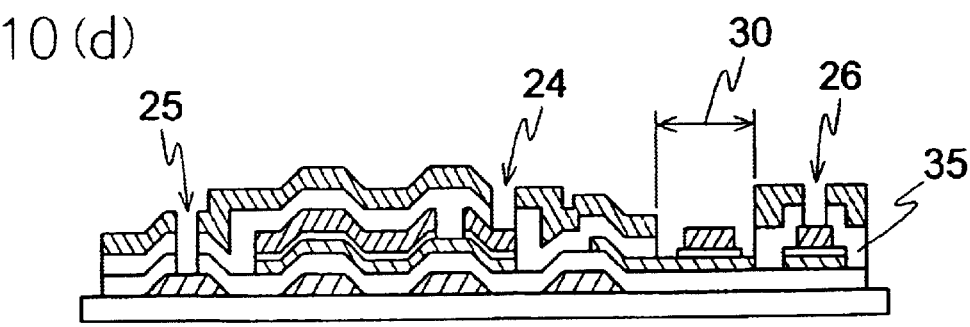

(9) After a passivation film 35 is formed on the whole surface of the TFT array substrate in this condition, a photoresist is applied and a resist pattern 36 is formed by using a photomask (FIG. 10(c)).

The photoresist pattern 36 is used for removing a part of the passivation film 35 to form contact holes 24, 25 and 26 at a next step, and at the same time, has such a pattern that the passivation film 35 in a region 30 which includes the source line 20 and the vicinity thereof is also removed.

(10) By using the resist pattern 36, the passivation film 35 is etched to form contact holes 24, 25 and 26. As described above, the passivation film 35 in the region 30, i.e. on the source line 20 and in the vicinity thereof, is also removed (FIG. 10(d)).

Figure 11A:
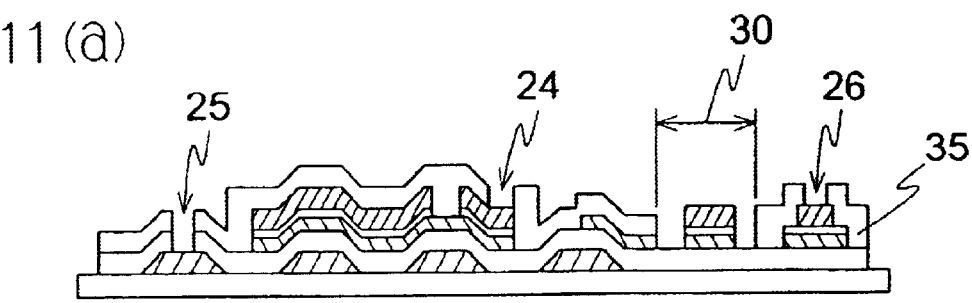
FIG. 11 is a sectional view for explaining the method for manufacturing a TFT array substrate according to the third embodiment of the present invention, illustrating succeeding steps to FIG. 10.

(11) Next, etching is carried out by using the resist pattern 36 and the source line 20 as masks, thereby removing the semiconductor layer 18 protruded under the source line 20 and the semiconductor layer 17 provided in the vicinity of the source line 20, and then removing the resist pattern (FIG. 11(a)).

At this time, the resist pattern may be removed earlier and the protruded semiconductor layer 18 and the semiconductor layer 17 may be etched by using the passivation film 35 and the source line 20 as masks.

Moreover, the second metal layer 19 forming the source line 20 is to be formed of such a material as not to be etched simultaneously with the etching of the semiconductor layer 18 and the semiconductor layer 17, for example, Cr or the like.

Figure 11B:
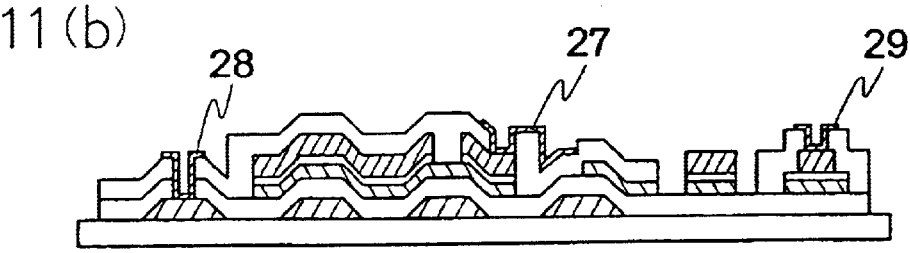

(12) Then, an ITO film is formed over the whole surface and photolithography is used to carry out the patterning, thereby forming an ITO pixel electrode 27 and upper pads 28 and 29 (FIG. 11(b)).

As described above, according to the present embodiment, the gate insulating film 16 provided in the vicinity of the source line 20 is not removed but left. Therefore, there is no possibility that a short circuit might be occurred between the source line 20 and the common line 14.

While the source line 20 is exposed in the present embodiment, it is a matter of course that the source line 20 can be covered with the ITO film in the same manner as described in the EMBODIMENT 2.

Embodiment 4

The EMBODIMENT 4 of the present invention will be described with reference to FIGS. 12 and 13. FIGS. 12 and 13 are sectional views showing a TFT array substrate provided with a reverse stagger type TFT, illustrating a manufacturing method therefor.

The present embodiment is different from the EMBODIMENT 1 in that the passivation film 35 is omitted.

The process will be described below.

Figure 12A:
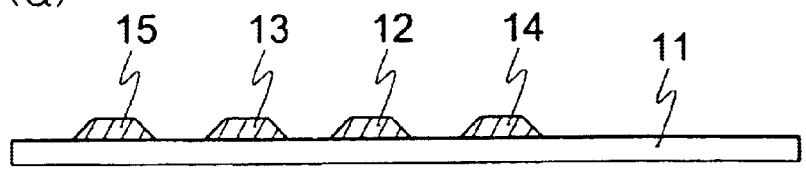
FIG. 12 is a sectional view for explaining a method for manufacturing a TFT array substrate according to a fourth embodiment of the present invention.

(1) First of all, a first metal layer is formed on an insulating substrate 11 and is then patterned by using photolithography to form a gate electrode 12, a gate line 13, a common line 14 and a lower pad 15 (FIG. 12(a)).

(2) Next, four layers of a gate insulating film 16, a first semiconductor layer 17, a second semiconductor layer 18 and a second metal layer 19 are formed on the substrate in order to cover the gate electrode 12, the gate line 13, the common line 14 and the pad 15.

Figure 12B:
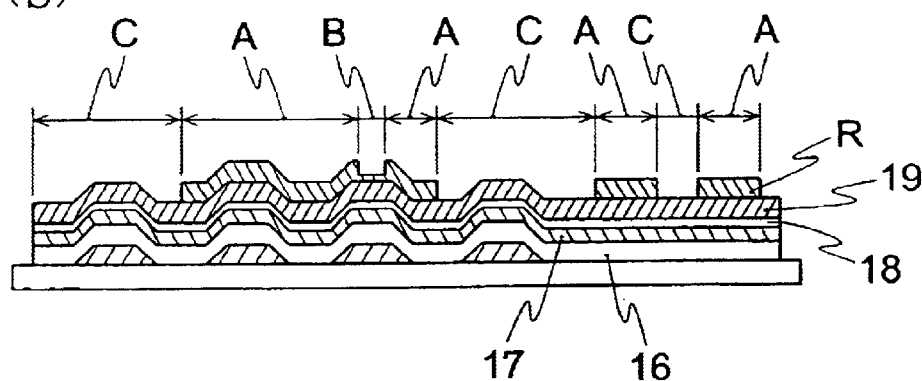

(3) After a photoresist R is applied, a resist pattern including a region A in which the photoresist R has a great thickness, a region B in which the photoresist R has a small thickness, and a region C in which the photoresist R is removed is formed (FIG. 12(b)).

Figure 12C:
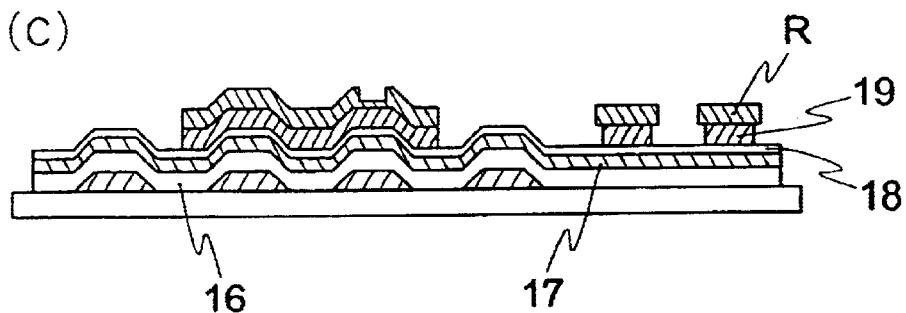

(4) Next, the second metal layer 19 in the region C is first removed by etching (FIG. 12(c)).

Figure 12D:
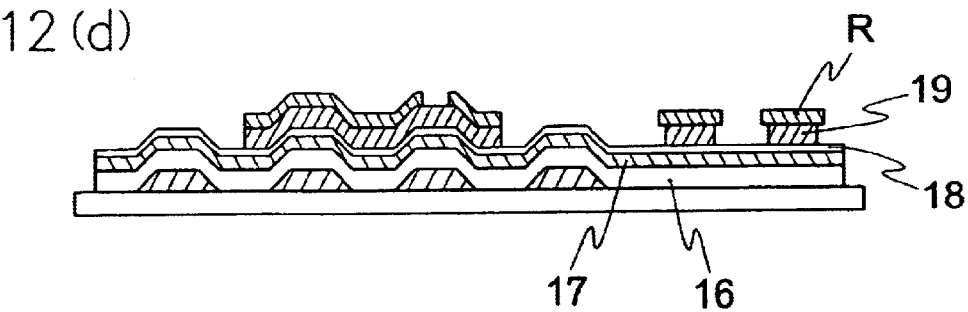

(5) Next, while the photoresist R in the region A is left, the photoresist R in the region B is removed (FIG. 12(d)).

Figure 12E:
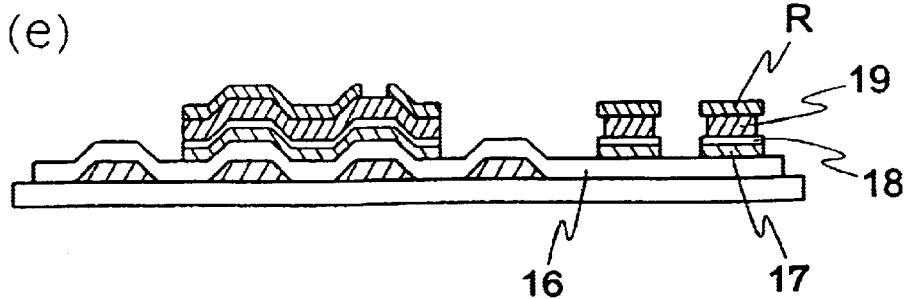

(6) Thereafter, the semiconductor layers 18 and 17 in the region C are removed by etching or the like (FIG. 12(e)).

Figure 13A:
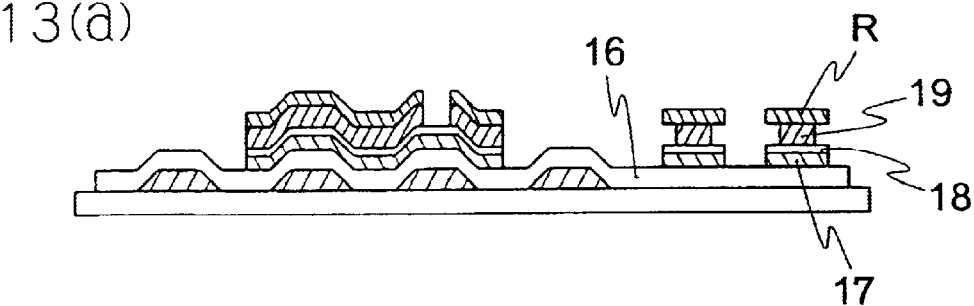
FIG. 13 is a sectional view for explaining a method for manufacturing a TFT array substrate according to the fourth embodiment of the present invention, illustrating succeeding steps to FIG. 12.

(7) Furthermore, the second metal layer 19 in the region B is removed (FIG. 13(a)).

Figure 13B:
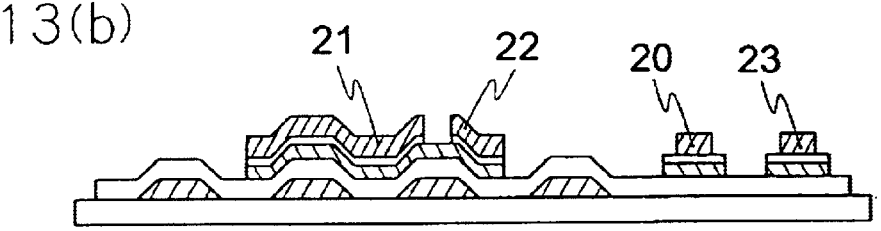

(8) Subsequently, the second semiconductor layer 18 in the region B is removed and the whole photoresist R is then removed (FIG. 13(b)).

The manufacturing steps described above are the same as those in the EMBODIMENT 1. As described above, the semiconductor layer 18 and the semiconductor layer 17 are protruded beside the source line 20.

(9) After a photoresist is applied to the surface of the TFT array substrate in this condition, and a photomask is used to form a resist pattern. Thus, a contact hole is formed in the gate insulating film 16 provided on the lower pad 15. By etching using the source line 20 as a mask, furthermore, the semiconductor layer 18 and the semiconductor layer 17 which are protruded under the source line 20 are removed (FIG. 13(c).

(10) Then, an ITO film is formed over the whole surface and photolithography is used to carry out the patterning, thereby forming an ITO pixel electrode 27 and upper pads 28 and 29. In the present embodiment, the ITO pixel electrode 27 and the drain electrode 22, and the upper pad layer 29 and the lower pad 23 are directly provided in contact with each other without using the contact hole (FIG. 13(d)).

Figure 6D:
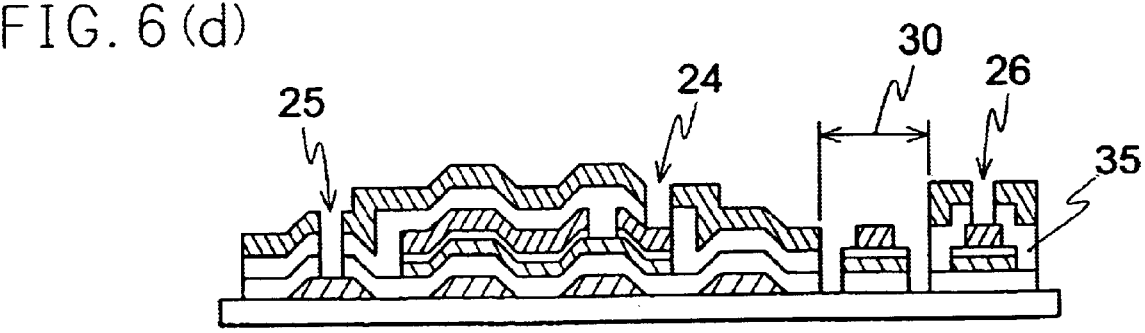

In the EMBODIMENT 1, the passivation film 35 provided in the vicinity of the source line 20 is removed in order to remove the semiconductor layer 18 and the semiconductor layer 17 which are protruded beside the source line 20 (FIG. 6(d)). At the same time, the gate insulating layer adjacent to the source line is also removed. Accordingly, in the case in which the source line 20 and the common line 14 are provided adjacently, there is a possibility that a short circuit might be occurred between both lines.

According to the present embodiment, it is not necessary to remove the passivation film 35. Therefore, the gate insulating film 16 provided in the vicinity of the source line 20 is not removed. Accordingly, also in the case in which the source line 20 and the common line 14 are provided adjacently, there is no possibility that a short circuit might be caused between both lines.

While the source line 20 is exposed in the present embodiment, it is a matter of course that the source line 20 can be covered with the ITO film in the same manner as in the EMBODIMENT 2.

According to the present embodiment, the passivation film 35 is omitted. Therefore, a TFT array substrate can be fabricated at a low cost in a short time, and the semiconductor layer 18 and the semiconductor layer 17 which are protruded beside the source line 20 can be removed. Therefore, an aperture ratio can be enhanced and the resistance of the source line can be reduced, and furthermore, it is possible to eliminate a drawback that a source-common capacitance is increased.

Embodiment 5

The EMBODIMENT 5 of the present invention will be described with reference to FIG. 14. FIG. 14 is a sectional view showing a TFT array substrate provided with a reverse stagger type TFT, illustrating a manufacturing method therefor.

In the EMBODIMENT 4 described above, the TFT array substrate is fabricated by using four photomasks in total, that is, carrying out photolithography four times. According to the present embodiment, it is possible to manufacture a TFT array substrate by using three photomasks, that is, carrying out the photolithography three times.

Figure 13C:
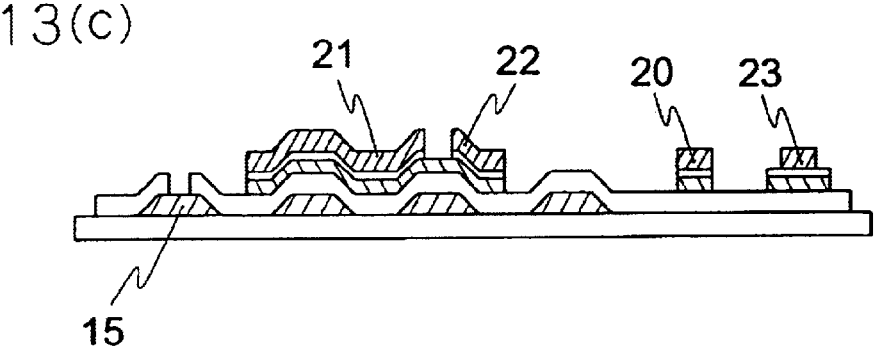
Figure 13D:
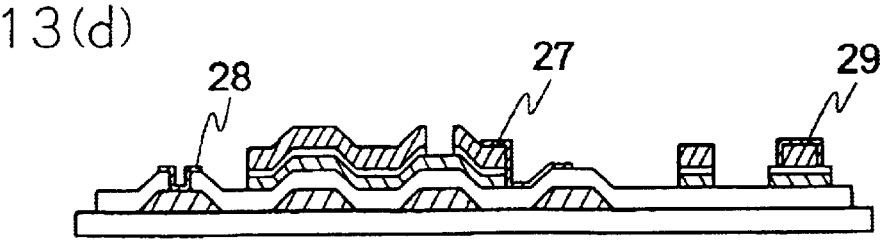

In the EMBODIMENT 4, at the step shown in FIG. 13(c), the photoresist is applied to the surface of the TFT array substrate, the photomask is used to form the resist pattern, and the contact hole is formed in the gate insulating film 16 provided on the lower pad 15.

Then, the ITO film is formed over the whole surface and the photolithography is used to carry out patterning, thereby forming the ITO pixel electrode 27 and the upper pads 28 and 29. Accordingly, the lower pad 15 and the upper pad 28 are electrically connected through a contact hole.

Figure 14A:
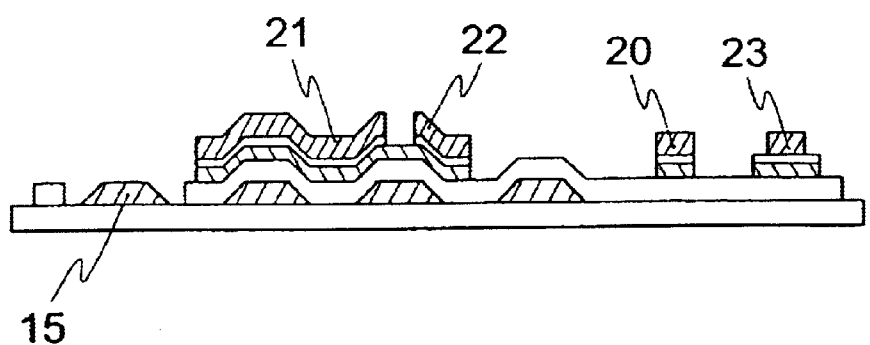
FIG. 14 is a sectional view for explaining a method for manufacturing a TFT array substrate according to a fifth embodiment of the present invention.
Figure 14B:
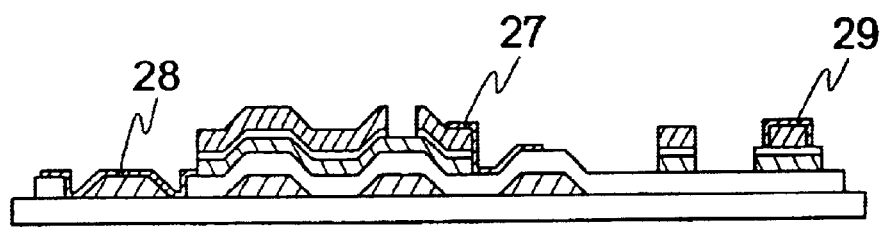

In the present embodiment, in contrast, the gate insulating film 16 provided on the lower pad 15 is removed without using the photomask before the ITO film is formed (FIG. 14(a)). The removal is carried out through a peripheral exposing step, in which the photoresist in the peripheral portion of the TFT array substrate is exposed without a mask, by also exposing the photoresist provided on the lower pad 15 to remove. The gate insulating film 16 provided on the lower pad 15 is thus exposed and removed at a succeeding etching step. Then, the ITO film is formed over the whole surface and is patterned by using the photolithography, thereby forming the ITO pixel electrode 27 and the upper pads 28 and 29 (FIG. 14(b)). In this case, the lower pad 15 and the upper pad 28 are directly provided in contact with each other and are electrically connected.

Since the photolithographic step of forming the contact hole in the gate insulating film 16 is not required, a TFT array substrate can be fabricated by carrying out the photolithographic step three times, that is, using three photomasks, so that a cost can be further reduced.

As a matter of course, in the same manner as in other embodiments, it is possible to remove the semiconductor layer 18 and the semiconductor layer 17 which are protruded beside the source line 20. Therefore, an aperture ratio can be enhanced and the resistance of the source wiring can be reduced, and furthermore, it is possible to eliminate a drawback that a source-common capacitance is increased.

While the source line 20 is exposed in the present embodiment, it is a matter of course that the source line 20 can be covered with the ITO film in the same manner as in the EMBODIMENT 2.

Industrial Applicability

By applying the manufacturing method according to the present invention, it is possible to remove a semiconductor layer which protrudes beside a source line through a manufacturing step using four photomasks as in the conventional art or three photomasks which are fewer than those in the conventional art. Consequently, it is possible to prevent a reduction in an aperture ratio, an increase in the resistance of the source line and an increase in a source-common capacitance. Thus, it is possible to manufacture a liquid crystal display of high quality inexpensively in a short time.

By covering the source line with the ITO film, furthermore, the reaction of the source line and a liquid crystal can be prevented, so that a degree of freedom in the selection of the material of the source line can be enhanced. Moreover, since the ITO film as well as an original source line can also function as the source line, the resistance of the source line can be further increased so that a liquid crystal display of high quality can be obtained, and furthermore, the possibility of a disconnection of the source line can be decreased so that reliability can be enhanced.

What is claimed is:

1. A method for manufacturing a TFT array substrate in which at least (a) a gate insulating film, (b) a semiconductor layer and (c) a metal layer are sequentially formed in this order of (a), (b) and (c), and using one resist pattern formed by a photolithography, a part of the metal layer is selectively removed, to form a source line, together with the semiconductor layer beside the source line, wherein a passivation film is formed after the formation of the source line and the removal of the semiconductor layer beside the source line, a resist pattern to selectively remove the passivation film is formed on the passivation film, and using the resist pattern, the passivation film above the source line, the passivation film beside the source line and the gate insulating film beside the source line are removed to, thereby, expose the semiconductor layer under the source line.

2. A method for manufacturing a TFT array substrate according to claim 1, wherein a portion protruding beside the source line is removed from the exposed semiconductor layer under the source line through etching utilizing the resist pattern to selectively remove the passivation film and/or the source line as a mask.

3. A method for manufacturing a TFT array substrate according to claim 1, wherein a portion protruding beside the source line is removed from the exposed semiconductor layer under the source line through etching utilizing the selectively removed passivation film and/or the source line as a mask.

4. A method for manufacturing a TFT array substrate according to claim 1 wherein a ITO film is further formed, and through patterning to selectively remove the ITO film, the ITO film on the source line is left to form the ITO film covering the source line.

5. A method for manufacturing a TFT array substrate in which as least (a) a gate insulating film, (b) a semiconductor layer and (c) a metal layer are sequentially formed in this order of (a), (b) and (c), and using one resist pattern formed by a photolithography, a part of the metal layer is selectively removed, to form a source line, together with the semiconductor layer beside the source line, wherein no passivation film is formed after the formation of the source line and the removal of the semiconductor layer beside the source line.

6. A method for manufacturing a TFT array substrate according to claim 5 wherein the removal of the semiconductor layer beside the source line is accomplished such that the source line and the semiconductor layer under the source line remain exposed, and a portion protruding beside the source line is removed from the exposed semiconductor layer under the source line through etching utilizing the source line as a mask.

7. A method for manufacturing a TFT array substrate according to claim 5 wherein a ITO film is further formed, and through patterning to selectively remove the ITO film, the ITO film on the source line is left to form the ITO film covering the source line.

8. A method for manufacturing a TFT array substrate in which at least (a) a gate insulating film, (b) a first semiconductor layer, (c) a second semiconductor layer and (d) a metal layer are sequentially formed in this order of (a), (b), (c) and (d), and a resist pattern comprising a region in which photoresist is removed, a region in which photoresist has a small thickness and a region in which photoresist has a great thickness is further formed by means of a photolithography, wherein the metal layer, the second semiconductor layer and the first semiconductor layer are removed in the region in which photoresist is removed, the metal layer and the second semiconductor layer are removed in the region in which photoresist has a small thickness, and the metal layer, the second semiconductor layer and the first semiconductor layer are left remained in the region in which photoresist has a great thickness to form a source line with the metal layer left remained, and wherein a region adjacent to the source line is the region in which photoresist has a small thickness, so that the metal layer and the second semiconductor layer are removed and the first semiconductor layer is left remained.

9. A method for manufacturing a TFT array substrate according to claim 8 wherein a passivation film is formed after removal of the photoresist, a resist pattern to selectively remove the passivation film is formed on the passivation film, and using the resist pattern, the passivation film above the source line and the passivation film beside the source line are removed to, thereby, expose the second and first semiconductor layers under the source line.

10. A method for manufacturing a TFT array substrate according to claim 8 wherein a ITO film is further formed, and through patterning to selectively remove the ITO film, the ITO film on the source line is left to form the ITO film covering the source line.

11. A method for manufacturing a TFT array substrate according to claim 9 wherein a portion protruding beside the source line is removed from the exposed second and first semiconductor layers under the source line through etching utilizing the resist pattern to selectively remove the passivation film and/or the source line as a mask.

12. A method for manufacturing a TFT array substrate according to claim 9 wherein a portion protruding beside the source line is removed from the exposed second and first semiconductor layers under the source line through etching utilizing the selectively removed passivation film and/or the source line as a mask.

13. A method for manufacturing a TFT array substrate in which at least (a) a gate insulating film, (b) a first semiconductor layer, (c) a second semiconductor layer and (d) a metal layer are sequentially formed in this order of (a), (b), (c) and (d), and a resist pattern comprising a region in which photoresist is removed, a region in which photoresist has a small thickness and a region in which photoresist has a great thickness is further formed by means of a photolithography, wherein the metal layer, the second semiconductor layer and the first semiconductor layer are removed in the region in which photoresist is removed, the metal layer and the second semiconductor layer are removed in the region in which photoresist has a small thickness, and the metal layer, the second semiconductor layer and the first semiconductor layer are left remained in the region in which photoresist has a great thickness to form a source line with the metal layer left remained, wherein a region adjacent to the source line is the region in which photoresist has a small thickness, so that the metal layer and the second semiconductor layer are removed and the first semiconductor layer is left remained, and wherein no passivation film is formed after removal of the resist pattern.

14. A method for manufacturing a TFT array substrate according to claim 13 wherein a portion protruding beside the source line is removed from the second and first semiconductor layers under the source line through etching utilizing the source line as a mask.

15. A method for manufacturing a TFT array substrate according to claim 14 wherein a ITO film is further formed, and through patterning to selectively remove the ITO film, the ITO film on the source line is left to form the ITO film covering the source line.

16. A method for manufacturing a TFT array substrate according to claim 14 wherein a photoresist on a lower electrode pad at the end of the gate line is removed through a peripheral exposing step in which no mask is used, so that a part of the gate insulating film is removed by etching to expose the lower electrode pad at the end of the gate line.

* * * * *